Figure 1:
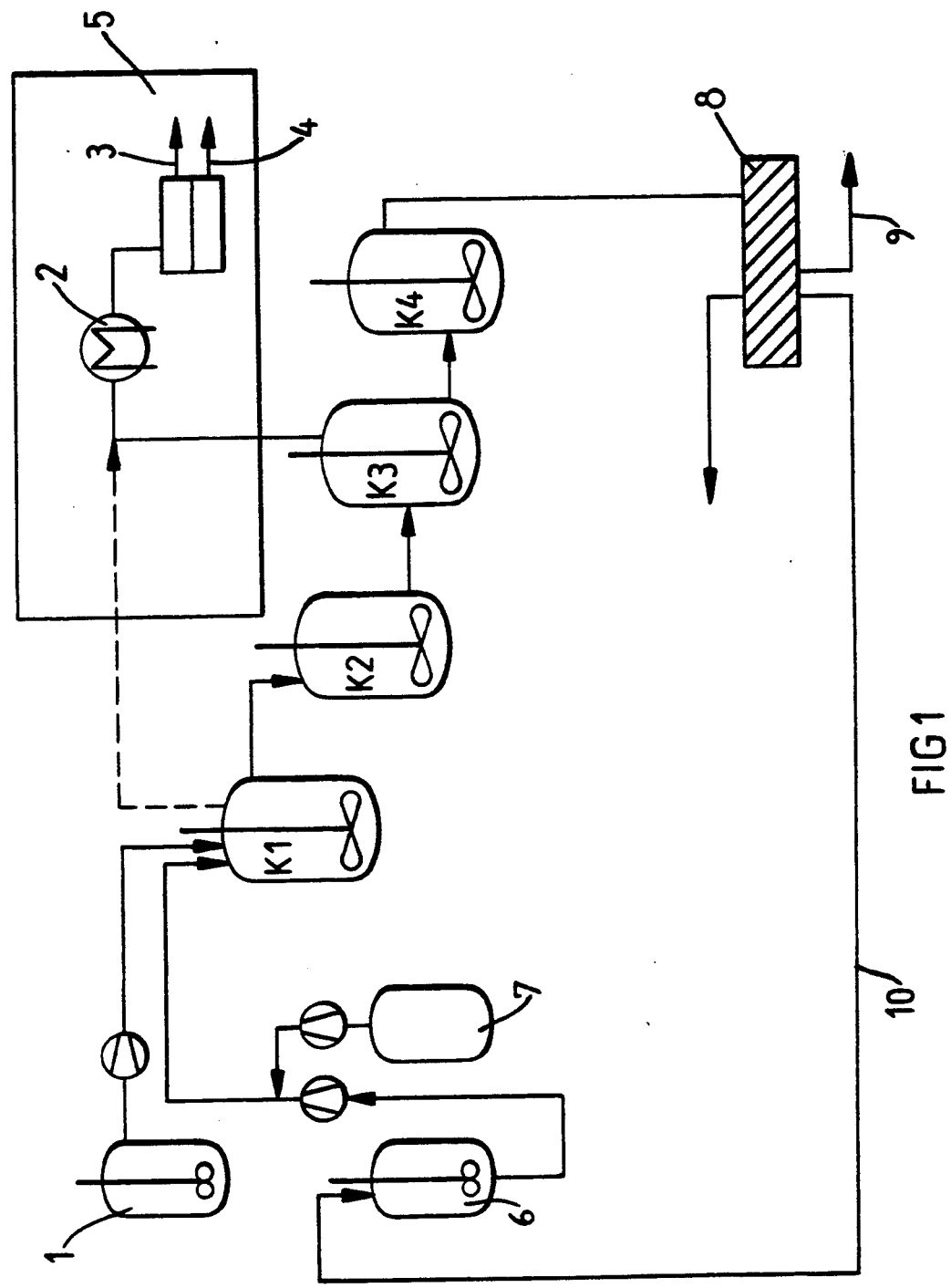

United States Patent [19]

Jansen et al.

[11] Patent Number: 5,314,990
[45] Date of Patent: May 24, 1994

[54] PROCESS FOR THE CONTINUOUS COAGULATION OF VINYL POLYMER LATICES

[75] Inventors: Ulrich Jansen, Dormagen; Karl-Heinz Ott, Leverkusen; Wolfgang Herrig, Bergisch Gladbach; Otto Koch, Cologne; Alfred Pischtschan, Kuerten-Eichhof; Dieter Wittmann, Cologne, all of Fed. Rep. of Germany

[73] Assignee: Bayer Aktiengesellschaft, Leverkusen, Fed. Rep. of Germany

[21] Appl. No.: 692,496

[22] Filed: Apr. 29, 1991

[30] Foreign Application Priority Data

May 12, 1990 [DE] Fed. Rep. of Germany ....... 4015296

[51] Int. Cl.$^5$ ............................................. C08F 6/16
[52] U.S. Cl. .................................... 528/486; 528/488; 528/490; 528/500; 528/503
[58] Field of Search ............... 528/503, 500, 486, 488, 528/490

[56] References Cited

U.S. PATENT DOCUMENTS

| | | | |
|---|---|---|---|
| 4,110,529 | 8/1978 | Stoy | 528/502 |
| 4,767,803 | 9/1988 | Yasui et al. | 528/502 |

FOREIGN PATENT DOCUMENTS

| | | |
|---|---|---|
| 0217006 | 4/1987 | European Pat. Off. . |
| 0333879 | 9/1989 | European Pat. Off. . |
| 2211483 | 7/1974 | France . |

*Primary Examiner*—Joseph L. Schofer
*Assistant Examiner*—Tom Weber
*Attorney, Agent, or Firm*—Connolly & Hutz

[57] ABSTRACT

A process for the continuous processing of vinyl polymer latices to produce thermoplastically processible vinyl polymer powder by coagulating a stream of a vinyl polymer latex by the addition of a stream of a coagulant with intensive mixing and shearing in a cascade of vessels at an average residence time per vessel of 10 to 60 minutes and at temperatures from 50 to 120° C., volatile auxiliary substances and residual monomers in the polymer being optionally removed by steam distillation and part of the serum separated from the vinyl polymer being added to the stream of coagulant.

13 Claims, 1 Drawing Sheet

PROCESS FOR THE CONTINUOUS COAGULATION OF VINYL POLYMER LATICES

This invention relates to a process for the continuous processing of vinyl polymer latices to produce thermoplastically processible vinyl polymer powder by coagulating a stream of a vinyl polymer latex by the addition of a stream of a coagulant with intensive mixing and shearing in a cascade of vessels at an average residence time per vessel of 10 to 60 minutes and at temperatures from 50° to 120° C. Volatile auxiliary substances and residual monomers in the polymer are being optionally removed by steam distillation. The process is characterized by recycling a part of the serum separated from the vinyl polymer by adding it to the stream of coagulant.

Vinyl polymer latices which can be processed according to the invention contain uncross-linked or partially cross-linked polymers. They may be prepared by homo-, co- and/or graft polymerisation in aqueous emulsion. The monomers used may in principle be any polymerisable olefinically unsaturated compounds but are preferably monovinyl compounds such as aromatic vinyl compounds (styrene, styrene derivatives), unsaturated nitriles (acrylonitrile, methacrylonitrile), acrylic and methacrylic acid derivatives (acrylic acid alkyl esters having 1 to 8 carbon atoms, such as butyl acrylate; methacrylic acid alkyl esters having 1 to 8 carbon atoms, such as methyl methacrylate), N-alkyl-and N-aryl-substituted maleic acid imides and divinyl compounds, for example, conjugated dienes (butadiene, isoprene, chloroprene). All the monomers may be used singly or in any combination. The polymers obtained are known, as are also their latices.

Latex mixtures may also be processed according to the invention. These mixtures may be prepared before or during the processing. Thus the latices may be mixed and the resulting mixture may be continuously processed or two or more streams of latices may be combined simultaneously with the stream of coagulant (see DE-A 1 694 918, DE-A 2 952 495, EP-A 0 121 855). The coagulation of polymer latices for obtaining polymers in solid form is known in principle. Thus DE-A 2 021 398 describes the coagulation of graft polymer latices at temperatures $\geq 80°$ C. with the aid of electrolyte solutions. It is known from U.S. Pat. No. 4,399,273 to coagulate a latex of an acrylonitrile/butadiene/styrene polymer (ABS) by the addition of an acid or of another electrolyte and to remove the residual monomers by the introduction of steam. This method gives rise to very large quantities of waste water which must be disposed of and the steam distillation for removal of the residual monomers (stripping) is carried out discontinuously so that means for intermediate storage and several vessel are required. Fluctuations in the product quality are observed owing to the discontinuous procedure.

DE-A-2 815 098 describes a continuous precipitation process for rubber latices. This process employs a cascade of vats connected together by overflows. Since open vats are employed, the residual monomers and volatile constituents cannot be separated off.

No satisfactory process has thus hitherto existed for the continuous processing up of vinyl polymer latices to produce thermoplastically processible vinyl polymer powder.

The process according to the invention described above enables from 10 to 95% by weight of the serum, i.e. the aqueous phase of the total coagulation medium separated from the polymer, to be returned to the coagulation process together with the coagulant. The quantity of fresh coagulant to be added is therefore greatly reduced and only a minor part of the serum must be still handled as waste water. At the same time, residual monomers can be continuously removed by steam distillation. From 10 to 95% of the monomers can generally be removed by this method.

A saving of about 50% of the coagulation auxiliaries, depending on the quantity of serum returned, and of large quantities of the water required for coagulation can be achieved by the process according to the invention.

Moreover, the unreacted monomers separated by steam distillation can be used again for polymerisation after their separation in a residence vessel.

The polymer powders obtained according to the invention have good overall properties, e.g. good powder properties (grain size distribution) and processing properties (suitability for ensilage). The properties of the thermoplastic moulding compounds prepared from the polymer powders obtained according to the invention are also good. Polymer powders prepared according to the invention result in an improvement in the surface quality in ABS and polymer-blend moulding compounds.

The process according to the invention is described in more detail below:

Vinyl polymer latices suitable for processing according to the invention include vinyl homo- and copolymers prepared by the emulsion polymerisation of, for example, styrene, α-methylstyrene, vinyl toluene, acrylonitrile, methacrylonitrile, acrylic and methacrylic acid esters, N-alkyl-and N-aryl-substituted acrylamide and methacrylamide, N-alkyl- and N-aryl-substituted maleic acid imides and mixtures of these monomers.

Graft polymer latices of vinyl compounds on a partially cross-linked, particulate rubber having average particle diameters ($d_{50}$) of from 50 to 1000 nm may also be used.

The following are examples of suitable graft polymerised vinyl compounds: Styrene, α-methylstyrene, acrylonitrile, methyl methacrylate, alkyl acrylate and mixtures thereof. Methyl methacrylate and mixtures of styrene and acrylonitrile, of α-methylstyrene and acrylonitrile, of methyl methacrylate and styrene, of methyl methacrylate and alkyl acrylate and of α-methyl-styrene, methyl methacrylate and acrylonitrile are particularly preferred. Suitable rubbers (graft bases) include diene homo-and copolymers, e.g. of butadiene, isoprene and chloroprene, optionally with up to 35% by weight of comonomers such as styrene, acrylonitrile, methyl methacrylate, alkyl acrylate or vinyl methyl ethers, or alkyl acrylate polymers (in particular of $C_1$–$C_8$ alkyl acrylates) optionally containing up to 20% by weight of vinyl monomers such as styrene, acrylonitrile, vinyl acetate or $C_1$–$C_8$-alkyl methacrylate incorporated by polymerisation. The acrylate rubbers are in most cases partially cross-linked by the incorporation of polyfunctional vinyl or allyl monomers by polymerisation. Examples of cross-linking monomers include bis-acrylates, bis- acrylamides, butadiene, acrylic acid vinyl esters, triallyl cyanurate, trialkyl isocyanurate, citric acid trisallyl esters and bis-carboxylic acid vinyl esters.

Acrylate rubbers contain the cross-linking monomers in quantities of up to 5% by weight. The rubbers may also have a core/sheath structure, i.e. the acrylate rubber particles may contain a rubber core differing structurally from the surrounding acrylate rubber or it may have a hard core of thermoplast resin.

The graft polymer latices generally contain from 30 to 90% by weight of rubber, preferably from 50 to 85% by weight.

The vinyl polymer latices may be prepared in a known manner by emulsion polymerisation in aqueous media or by emulsion graft polymerisation in the presence of rubber latices. For polymers which are free from rubber, the monomers are polymerised by radical polymerisation in an aqueous medium at pH values of about 12 to 2, in particular from 10 to 3, in the presence of soaps (emulsifiers). Suitable initiators include in particular water-soluble radical formers such as peroxodisulphates, peroxodiphophates, water-soluble hydroperoxides and peroxo acids as well as redox initiator systems. Polymerisation, which is normally carried out at 40° to 90° C., requires the presence of an ionic emulsifier, in particular an anionic emulsifier, in quantities of up to 4% by weight, preferably up to 2.5% by weight, based on the monomers. Examples of suitable emulsifiers include fatty acid salts, alkyl sulphonic acid salts containing relatively long chained alkyl groups and sulphuric acid alkyl semiesters containing relatively long chained alkyl groups and, preferably, alkali metal salts of disproportionated abietic acid.

The vinyl polymer latices thus prepared generally have a polymer solids content of from 10 to 70% by weight, preferably from 25 to 50% by weight. The proportion of non-polymerised monomers in the latex is generally from 0 to 15% by weight, preferably from 0 to 5% by weight, based on the polymer solids content of the latex. The size of the vinyl polymer latex particles is from 50 to 1000 nm, preferably from 80 to 650 nm.

The process according to the invention may also be used for processing latex mixtures, in which case it may be advantageous, depending on the type of latex, not to mix the latices before they are introduced but to introduce them separately into the coagulation dispersion, either in parallel or stepwise.

The coagulants used are preferably aqueous solutions of water-soluble inorganic or organic acids and/or salts, such as hydrochloric acid, sulphuric acid, phosphoric acid, boric acid, formic acid, acetic acid, propionic acid, citric acid, alkali metal and alkaline earth metal chlorides, sulphates, formates, acetates, phosphates and carbonates, aluminates and partially saponified polyvinyl acetates, optionally in combination with inorganic or organic acids. From 0.2 to 25% by weight of aqueous solutions are used, depending on the vinyl polymer latex mixture to be coagulated.

Part of the serum which has been separated from the precipitated polymer is added to the coagulant or added to the polymer latex together with the coagulant.

The serum is the filtrate of the precipitation dispersion after separation of the polymer which contains residual moisture.

The liquid consisting of added coagulant and serum will therefore hereinafter be referred to as precipitation liquor.

According to the invention, therefore, at least 10% by weight, preferably from 50 to 99% by weight, of the precipitation liquor consists of serum, the remainder being coagulant.

The process according to the invention is carried out in a cascade of at least 3, preferably 4 or more reactors arranged in series and connected selectively either through overflows and/or through underflows, preferably underflows.

The latices may be coagulated at temperatures from 50° to 120° C. and at pressures from 0.2 to 1.5 bar. The individual precipitation reactors may be at the same or different temperatures. The temperature in the first precipitation reactor is preferably from 50° to 100° C., more preferably from 85° to 95° C. In one particular embodiment of the process, the reactors of the precipitation cascade, in which precipitation dispersion is carried out at boiling heat, are connected together by underflows. The average dwell time of the precipitation dispersion per reactor is from 10 to 60 minutes, depending on the type of polymer, preferably from 15 to 35 minutes. The quantity of vinyl polymer latex and the quantity of precipitation liquor (aqueous solution of the coagulant and serum) are adjusted to one another so that the polymer solids content in the precipitation dispersion is from 5 to 50% by weight, preferably from 15 to 40% by weight.

The vinyl polymer latex and the precipitation liquor may be introduced together into the first reactor of the precipitation cascade through a mixing nozzle. They may also be introduced into several reactors in partial streams, either parallel to stepwise, but it is preferable to introduce the whole precipitation liquor into the first reactor of the precipitation cascade.

The serum is obtained as filtrate after discharge from the last reactor of the precipitation cascade. It is also important to adjust the partial streams of the precipitation liquor so that the concentration of coagulant in the cascade of precipitation vessels remains stationary. The partial streams of precipitation liquor composed of coagulant and serum are in many cases brought together and introduced together into the cascade of vessels.

According to the invention, residual monomers may be separated off by continuous steam distillation in the processing of the vinyl polymer latices or latex mixtures. This treatment of the precipitation dispersion, also known as stripping, may be carried out simultaneously with and/or (preferably) after coagulation of the vinyl polymer latex, selectively in one or more precipitation reactors. The precipitation reactors in which "stripping" is carried out are preferably connected together by underflows.

The moist vinyl polymer powders separated from the precipitation dispersion by filtration may be washed in known manner, e.g. on band presses or peeling centrifuges, and then dried (e.g. in hot air driers). The polymers are then obtained as powders with a good grain size distribution, easy flow and stability in storage as well as thermoplastic processibility. Since the polymer powders are thermoplastic synthetic resins (e.g. ABS polymers) or used as blend components for polycarbonates, polyamides, PVC or polyesters for the purpose of improving the properties of the latter, e.g. their notched impact strength, resistance to petrol or processibility, it is important that the powders should be of a consistency which enables them to be introduced readily into continuously operating processing apparatus for thermoplasts and should mix with the melt of the thermoplastic synthetic resin at high temperatures and be uniformly distributed or dissolved therein. Products which have been processed according to the invention have these properties.

EXAMPLES OF PRACTICAL APPLICATION

VINYL POLYMER LATICES

A) Partially cross-linked polybutadiene latex (average diameter of latex particles $d_{50}=400$ nm) grafted with styrene and acrylonitrile in a ratio by weight of 72:28 and having a polymer content of 34.3% by weight and a residual monomer content of 0.75% by weight, based on the polymer. The graft polymer contains 50% by weight of rubber.

B) Partially cross-linked polybutadiene latex (average diameter of latex particles $d_{50}=110$ nm) grafted with styrene and acrylonitrile in a ratio by weight of 72:28 and having a polymer content of 34.3% by weight and a residual monomer content of 0.50% by weight, based on the polymer. The graft polymer contains 50% by weight of rubber.

C) Partially cross-linked poly-n-butylacrylate latex (average diameter of latex particles $d_{50}=450$ nm) grafted with styrene and acrylonitrile in a ratio by weight of 72:28 and having a polymer content of 39% by weight and a residual monomer content of 0.65% by weight, based on the polymer. The graft polymer contains 60% by weight of rubber.

D) Partially cross-linked poly-n-butylacrylate latex (average diameter of latex particles $d_{50}=130$ nm) grafted with styrene and acrylonitrile in a ratio by weight of 72:28 and having a polymer content of 39% by weight and a residual monomer content of 0.50% by weight, based on the polymer. The graft polymer contains 30% by weight of rubber.

E) Latex of an α-methylstyrene/acrylonitrile copolymer (ratio by weight 72:28) (average latex particle diameter $d_{50}=90$ nm) having a polymer content of 34.5% by weight and a residual monomer content of 0.80% by weight, based on the polymer.

The latices are prepared by known methods (see U.S. Pat. No. 4,399,273, U.S. Pat. No. 3,111,501). The average latex particle diameters ($d_{50}$-values) were determined by ultracentrifuge measurement (W. Scholtan, H. Lange; Kolloidz. und Z. Polymere 250 (1972), 782-796).

Method of Working Up

Coagulation was carried out in a cascade of 4 10 1 stirrer vessels arranged in series. The arrangement is shown in FIG. 1. The reference numerals have the following meanings:

| | |
|---|---|
| 1 | Latex storage vessel |
| 2 | Condensor |
| 3 | Discharge of monomer |
| 4 | Separation of water |
| 5 | Steam distillation |
| 6 | Storage vessel for returned serum |
| 7 | Storage vessel for coagulant |
| 8 | Filter |
| 9 | Effluent pipe |
| 10 | Return pipe for coagulant |
| K1-K4 | Precipitation reactors |

The precipitation reactors K1 and K2 are connected by an overflow while the reactors K2, K3 and K4 are connected by an underflow. The latex and precipitation liquor are introduced into the precipitation reactor K1. The precipitation dispersion obtained at the overflow of precipitation reactor K4 was separated on a filter 8 and the serum obtained there was returned to the precipitation reactor K1 in the quantities indicated in the Examples while the remainder was removed. After the cascade of precipitation vessels has reached steady state conditions a polymer sample was taken and analysed. For further working up, the separated, moist powders were washed free from electrolyte with water and dried to residual moisture contents of $\leq 0.5\%$ by weight in a vacuum at 70° C.

Analysis of the Dried Polymer Powder

1. The grain size distribution was analysed with a sifting machine in which the testing screen had been standardized according to DIN 4188. The sifting machine operated with vibration screens (Manufacturer: Harer and Brecker, Model EMC 200-61). For results see Table 1.

2. Pressure loading test Power was introduced to a filling height of 40 mm into a cylindrical tube measuring 40 mm in internal diameter and 60 mm in height and the powder was loaded with a ram (diameter 38 mm) weighing 3 kg for 24 hours at room temperature.

The contents of the tube were then carefully pushed out and assessed. Very free flowing powders form a conical heap or a cylinder which collapses on contact (Assessment+) whereas powder which has caked or formed lumps gives rise to stable bodies in the form of columns (Assessment−) which can only be broken down by firm pressure by hand. The results of the pressure loading test are shown in Table 1.

3. Properties of moulded articles produced from polymer powders

The vinyl polymers are compounded in an internal kneader and test samples are then produced by injection moulding (see Table 2).

Measurements 3.1 The notched impact strength was measured at room temperature by the method of ISO 180 on rods measuring $80 \times 10 \times 4$ mm at the injection moulding temperatures ("MT") shown in Table 2.

3.2 The hardness was measured as ball indentation hardness according to DIN 53 546 on rods measuring $80 \times 10 \times 4$ mm).

3.3 The dimensional stability under heat was determined according to Vicat B 120 (DIN 53 460).

3.4 The surface quality (untreated colour) was assessed visually in terms of +/o/− and the degree of gloss was assessed according to DIN 67 530 on injection moulded parts measuring $75 \times 155 \times 2$ mm.

EXAMPLES AND COMPARISON EXAMPLES

Example 1

8.0 l/h of latex A and at the same time a total of 10 l/h of precipitation liquor were introduced continuously into the first reactor K1 of the precipitation cascade. The precipitation liquor consisted of a partial stream 1 (9.5 l/h) containing 0.15% by weight of acetic acid and 0.54% by weight of magnesium sulphate and a partial stream 2 (0.5 l/h) containing 2.8% by weight of acetic acid and 6.3% by weight of magnesium sulphate, which were intimately mixed with the latex. The temperatures in the precipitation reactors were K1: 92° C., K2: 95° C., K3: 95° C. and K4: 80° C. The precipitation dispersion overflowing from precipitation reactor K4 was separated on a filter. After 3 hours, the serum separated at the filter was returned to the reactor K1 (quantity 9.5 l/h) instead of the partial stream 1 of the precipitation liquor and the remainder (2.5 l/h) was removed. 79% by weight of the serum were thus returned.

The polymer separated at the filter (residual moisture 54% by weight) was washed free from electrolytes and dried to a residual water content of $\leq 0.5\%$ by weight in a hot air drier. A 30 hour sample was investigated for its suitability for practical application (see Tables 1 and 2).

COMPARISON EXAMPLE 1

8.0 l/h of latex A and at the same time a total of 10 l/h of precipitation liquor containing 0.28% by weight of acetic acid and 0.83% by weight of magnesium sulphate were continuously introduced into the first reactor K1 of the precipitation cascade as in Example 1 and mixed together. The temperatures in the precipitation reactors K1 to K4 were the same as in Example 1. The precipitation dispersion overflowing from the fourth precipitation reactor K4 was separated on a filter.

The polymer (residual moisture 55% by weight) separated at the filter was washed free from electrolyte and dried to a residual water content of $\leq 5\%$ by weight in a hot air drier. A 10 hour sample was investigated for its properties for practical application (see Tables 1 and 2).

EXAMPLE 2

8.0 l/h of latex A and at the same time a total of 10 l/h of precipitation liquor consisting of a partial stream 1 (9.5 l/h) containing 0.15% by weight of acetic acid and 0.54% by weight of magnesium sulphate and a partial stream 2 (0.5 l/h) containing 2.8% by weight of acetic acid and 6.3% by weight of magnesium sulphate were continuously introduced into the first reactor of the precipitation cascade as in Example 1. The temperatures in the precipitation reactors were K1: 92° C., K2: 95° C., K3: 100° C. and K4: 90° C. Steam distillation was carried out in reactor K3 (0.9 kg of distillate/h). The precipitation dispersion overflowing from the fourth precipitation reactor K4 was separated on a filter. After about 2.5 hours, the serum separated at the filter was returned to reactor K1 (quantity 9.5 l/h) instead of the partial stream 1 of the precipitation liquor and the remainder (2.5 l/h) was removed. 79% of the serum obtained at the filter were thus returned.

The polymer separated at the filter (residual moisture 50% by weight) was washed free from electrolyte and dried to a residual water content of $\leq 0.5\%$ by weight in a hot air drier. A 35 hour sample was investigated for its properties for practical application (see Tables 1 and 2).

EXAMPLE 3

A mixture of 12.5 parts by weight of latex A, 12.5 parts by weight of latex B and 75 parts by weight of latex E were continuously introduced into the first reactor K1 of the precipitation cascade at the rate of 6.8 l/h together with a total of 11.7 l/h of precipitation liquor consisting of a partial stream 1 (7.0 l/h) containing 0.02% by weight of sulphuric acid and 0.35% by weight of magnesium sulphate and a partial stream 2 (4.7 l/h) containing 0.04% by weight of sulphuric acid and 0.68% by weight of magnesium sulphate. The temperature in the precipitation reactors were K1: 100° C., K2: 100° C., K3: 100° C. and K4: 90° C. Steam distillation was carried out in reactors 1 and 3 (1.5 kg total amount of distillate/h). The precipitation dispersion overflowing from the fourth precipitation reactor K4 was separated on a filter. After about 3 hours, the serum separated on the filter was returned to reactor K1 (quantity 7.0 l/h) instead of the partial stream 1 of the precipitation liquor and the remainder (7.0 l/h) was discarded. 50% of the total quantity of serum obtained at the filter were returned.

The polymer separated at the filter (residual moisture 49% by weight) was washed free from electrolyte and dried to a residual water content $\leq 0.5\%$ by weight in a hot air drier. A 40 hour sample was investigated for its properties for practical application (see Tables 1 and 2).

COMPARISON EXAMPLE 2

6.8 l/h of latex mixture A+B+E were continuously introduced into the first reactor K1 of the precipitation cascade as in Example 3. At the same time, a total of 11.7 l/h of precipitation liquor containing 0.03% by weight of sulphuric acid and 0.48% by weight of magnesium sulphate was introduced and mixed with the latex. The temperatures in the precipitation reactor were K:1 100° C., K2: 100° C., K3: 100° C. and K4: 90° C. The precipitation dispersion overflowing from the fourth precipitation reactor K4 was separated on a filter.

The polymer (residual moisture content 45% by weight) separated on the filter was washed free from electrolytes and dried to a residual water content of $\leq 0.5\%$ by weight in a hot air drier. A 10 hour sample was investigated for its properties for technical application (see Tables 1 and 2).

EXAMPLE 4

7.0 l/h of a mixture of latex C and latex D in a ratio by weight of 1:5 were continuously introduced into the first reactor K1 of the precipitation cascade and at the same time a total of 11 l/h of precipitation liquor consisting of a partial stream 1 (6.0 l/h) containing 0.2% by weight of acetic acid and 2.1% by weight of magnesium sulphate and a partial stream 2 (5.0 l/h) containing 0.4% by weight of acetic acid and 4.9% by weight of magnesium sulphate were introduced and mixed with the latex. The temperatures in the precipitation reactors were K1: 95° C., K2: 98° C., K3: 100° C., K4: 85° C. Steam distillation was carried out in reactor K3 (1.5 kg of distillate/h). The precipitation dispersion overflowing from the fourth precipitation reactor K4 was separated on a filter. After 3 hours, the serum separated at the filter was returned to the precipitation vessel 1 (quantity: 6.0 l/h) instead of the partial stream 1 of the precipitation liquor and the remainder (5.2 l/h) was discarded. 54% of the total quantity of serum obtained at the filter were returned.

The polymer (residual moisture content 60% by weight) separated at the filter was washed free from electrolytes and dried to a residual water content of $\leq 0.5\%$ by weight in a hot air drier. A 30 hour sample of powder was investigated analytically (see Table 1).

COMPARISON EXAMPLE 3

7.0 l/h of latex D+C and at the same time a total of 11 h/h of precipitation liquor containing 0.3% by weight of acetic acid and 3.4% by weight of magnesium sulphate were continuously introduced into the first reactor K1 of the precipitation cascade as in Example 4. The temperatures in the precipitation reactors were K1: 95° C., K2: 99° C., K3: 99° C., K4: 85° C. The precipitation dispersion overflowing from the fourth precipitation reactor was separated on a filter.

The polymer (residual moisture content 65% by weight) separated on the filter was washed free from electrolyte and dried to a residual water content of ≦0.5% by weight in a hot air drier. A 10 hour sample of powder was investigated analytically (see Table 1).

Table 1 shows that the vinyl polymer latices according to the invention can be worked up into a powder in a precipitation cascade with considerably reduced formation of effluent and significantly reduced requirement for coagulation auxiliaries without impairment of the use properties of the vinyl polymer powder.

Table 2 confirms the good use properties of the polymer powders worked up according to the invention after thermoplastic processing.

TABLE 1

Process parameters and properties of powders

| Process parameters (stationary operation) | Examples | | | | Comparison Examples | | |
|---|---|---|---|---|---|---|---|
| | 1 | 2 | 3 | 4 | 1 | 2 | 3 |
| Requirement for precipitating agent (% by wt. of polymer) | 1.7 | 1.7 | 1.5 | 9.7 | 4.0 | 2.6 | 14.8 |
| Requirement for precipitation water (% by wt. of polymer) | 18 | 18 | 203 | 183 | 364 | 509 | 403 |
| Quantity of waste water (% by wt. of polymer) | 91 | 124 | 368 | 245 | 437 | 609 | 374 |
| Contamination with waste water TOC (mg/l)* | 3700 | 2600 | 2500 | 2200 | 1900 | 1900 | 4800 |
| Return of serum (% by wt. of total filtrate) | 79 | 79 | 50 | 59 | 0 | 0 | 0 |
| Residual monomer content (polymer moisture content/ppm) | 2800 | 900 | 1700 | 1200 | 3100 | 3800 | 3200 |
| Grain size distribution % | | | | | | | |
| <0.1 mm | 10 | 2 | 10 | 15 | 12 | 19 | 16 |
| >0.1 mm | 62 | 53 | 82 | 58 | 57 | 43 | 65 |
| >0.5 mm | 16 | 22 | 3 | 14 | 19 | 17 | 12 |
| >0.8 mm | 5 | 10 | 1 | 8 | 7 | 8 | 5 |
| >1.0 mm | 6 | 10 | 3 | 4 | 5 | 13 | 2 |
| >2.0 mm | 1 | 3 | 1 | 1 | 0 | 0 | 0 |
| Pressure loading | + | + | + | + | + | + | + |

*)TOC: Proportion of bound carbon after pyrolysis of waste water

TABLE 2

Properties for technical application

| Composition: | Examples | | | Comparison Examples | | |
|---|---|---|---|---|---|---|
| | I | II | III | I (V) | II (V) | III (V) |
| Polymer Example 2 | 40 | — | 24 | — | — | — |
| Polymer Example 3 | — | 100 | — | — | — | — |
| Polymer Compar. Ex. 1 | — | — | — | 40 | — | 24 |
| Polymer Compar. Ex. 2 | — | — | — | — | 100 | — |
| SAN copolymer*) | 60 | — | 16 | 60 | — | 16 |
| PC (Makrolon 2600, Bayer AG) | — | — | 60 | — | — | 60 |
| Properties: | | | | | | |
| Notched impact strength (kJ/m2) | | | | | | |
| Izod a$_k$(23° C., MT 240° C.) | 32 | 13 | | 32 | 13 | |
| Izod ak(23° C., MT 260° C.) | | | 55 | | | 54 |
| Hardness Hc(30') | 86 | 118 | | 87 | 118 | |
| Vicat B 120 (°C.) | 101 | 115 | 123 | 100 | 113 | 123 |
| Surface quality Natural color | | | | | | |
| (MT 240° C.) | + | + | | + | + | |
| (MT 260° C.) | + | + | + | + | + | + |
| (MT 280° C.) | + | + | + | + | ○ | + |
| (MT 310° C.) | | | + | | | ○ |
| Degree of Gloss | 84 | 79 | | 87 | 68 | |

*)SAN copolymer Styrene/acrylonitrile comonomer ratio 72/28 parts by wt.; Mw = 110 kg/mol

We claim:

1. A process for the continuous processing of vinyl polymer latices to produce thermoplastically processable vinyl polymer powders, comprising coagulating a stream of vinyl polymer latex at temperatures of 50 to 120 degrees C. by the addition of a stream of an aqueous solution of coagulant with intensive mixing and shearing in a cascade of vessels at an average residence time per vessel of from 10 to 60 minutes, removing volatile auxiliary substances and residual monomers in the polymer by steam distillation, and recycling part of the serum separated from the vinyl polymer to the stream of coagulant.

2. The process of claim 1, wherein the coagulant comprises an aqueous solution of a water-soluble inorganic acid, organic acid or salt thereof.

3. A process according to claim 1 wherein the vinyl polymer latex is a graft polymer latex of vinyl compounds onto a partially cross-linked particulate rubber.

4. A process according to claim 1, wherein the vinyl polymer latex comprises two or more different latices.

5. A process according to claim 1, wherein the vinyl polymer latex is a graft of styrene and acrylonitrile onto partially crosslinked polybutadiene.

6. A process according to claim 1, wherein the vinyl polymer latex is a graft of styrene and acrylonitrile onto partially crosslinked butylacrylate.

7. A process according to claim 1, wherein the vinyl polymer latex has a solids content of 10 to 70% by weight.

8. A process according to claim 7, wherein the vinyl polymer latex has a solids content of 25 to 50% by weight.

9. A process according to claim 2, wherein the coagulant is an aqueous solution of hydrochloric acid, sulphuric acid, phosphoric acid, boric acid, formic acid, acetic acid, propionic acid, citric acid, alkali metal and alkali earth metal chlorides, sulphates, formates, acetates, phosphates or carbonates, aluminates and partially saponified polyvinyl acetates, optionally in combination with an inorganic or organic acid.

10. A process according to claim 9, wherein the coagulant solution contains acetic acid and magnesium sulphate.

11. A process according to claim 9, wherein the coagulant solution contains sulfuric acid and magnesium sulphate.

12. A process according to claim 1, wherein the cascade of vessels comprises at least three vessels, the temperature of the vessels being in the range of 50° to 120° C. at a pressure in each vessel of 0.2 to 1.5 bar.

13. A process according to claim 12, wherein the cascade comprises four vessels, at temperatures of 92°–100° C. in the first vessel, 95°–100° C. in the second vessel, 95°–100° C. in the third vessel, and 80°–90° C. in the fourth vessel.

* * * * *